United States Patent [19]
Booher

[11] Patent Number: 4,767,134
[45] Date of Patent: Aug. 30, 1988

[54] VEHICLE SUSPENSION SYSTEM WITH MULTIPLE OVERLAPPING COMPOSITE CONTROL ARM ELEMENTS

[76] Inventor: Benjamin V. Booher, 1721 Aldersgate, Leucadia, Calif. 92024

[21] Appl. No.: 23,674

[22] Filed: Mar. 9, 1987

Related U.S. Application Data

[63] Continuation-in-part of Ser. No. 835,187, Mar. 3, 1986, abandoned, which is a continuation-in-part of Ser. No. 717,791, Mar. 29, 1985, abandoned, which is a continuation of Ser. No. 525,011, Aug. 22, 1983, Pat. No. 4,509,774.

[51] Int. Cl.$^4$ ............................................. B60G 21/04
[52] U.S. Cl. .................................. 280/719; 280/669; 280/688; 280/694; 280/697; 267/47; 267/149
[58] Field of Search ............... 280/694, 669, 699, 719, 280/720; 267/41, 47, 149, 151, 160, 158

[56] References Cited

U.S. PATENT DOCUMENTS

| | | | |
|---|---|---|---|
| 2,319,172 | 5/1943 | Watson et al. | 267/47 |
| 2,635,894 | 4/1953 | Jackman | 280/664 |
| 2,882,043 | 4/1959 | Benz | 267/47 |
| 3,034,802 | 5/1962 | Axtmann | 280/694 |
| 3,377,060 | 4/1968 | Sherwood | 267/47 |
| 3,456,939 | 7/1969 | Duchemin | 267/47 |
| 3,989,425 | 11/1976 | Walker et al. | 267/47 |
| 4,540,197 | 9/1985 | Finn | 280/697 |
| 4,557,500 | 12/1985 | Collard et al. | 280/669 |

OTHER PUBLICATIONS

PPG Industries article entitled "An Experiment in Weight Reduction . . ." two pages—undated.

*Primary Examiner*—Richard A. Bertsch
*Attorney, Agent, or Firm*—Baker, Maxham & Jester

[57] ABSTRACT

A vehicle suspension system includes a primary composite control arm element and a secondary composite control arm element. The secondary element has a length shorter than a length of the primary element. A root attachment assembly is provided for mounting an inner end of each of the primary and secondary elements to a corresponding side of a vehicle frame. The primary and secondary elements are positioned relative to each other such that the secondary element overlaps an inner portion of the primary element. An outer portion of the primary element extends beyond an outer end of the secondary element. A wheel hub assembly is mounted to the outer portion of the primary element. A shock absorber is connected to the side of the frame for damping motion of the outer end of the primary element relative to the frame. The primary and secondary composite control arm elements provide greater overall strength, a progressive spring rate, and over-load protection.

20 Claims, 1 Drawing Sheet

VEHICLE SUSPENSION SYSTEM WITH MULTIPLE OVERLAPPING COMPOSITE CONTROL ARM ELEMENTS

CROSS REFERENCE TO RELATED APPLICATIONS

This application is a continuation-in-part of my prior pending U.S. patent application Ser. No. 835,187 filed Mar. 3, 1986, now abandoned entitled "Vehicle Suspension System with Flexible Control Arm" which was in turn a continuation-in-part of my prior pending U.S. patent application Ser. No. 717,791 filed Mar. 29, 1985 now abandoned, entitled "Vehicle Suspension System with Flexible Control Arm" which was in turn a continuation of my earlier U.S. patent application Ser. No. 525,011 filed Aug. 22, 1983 entitled "Composite Control Arm Apparatus" and now U.S. Pat. No. 4,509,774 granted Apr. 9, 1985.

BACKGROUND OF THE INVENTION

The present invention relates to vehicle suspension systems, and more particularly, to an automotive suspension system in which multiple overlapping composite elements function both as control arms and springs to thereby reduce the weight and number of parts otherwise required.

Vehicle suspension systems have heretofore included shock absorbers, springs (coil, leaf, air or torsion bar), axle housings, torque arms, A-frames, anti-roll bars, stabilizers, and so forth. These components have been assembled in various combinations to produce the desired ride and handling characteristics of the vehicle. In a typical suspension system, changes in the spacing between axles and the body/chassis are cushioned by springs, spring vibration is limited by dampers which are usually called shock absorbers. The shock absorbers dissipate the energy stored in the springs by gradually forcing oil through orifices and valves. The flow resistance encountered by the oils results in compression and rebound forces which control the spring movement. The work done by the oils as it moves through the valves converts energy stored in the springs into heat which is dissipated from the shock absorbers into the surrounding air.

There is a continuing effort to reduce the manufacturing cost of automobiles. There is also a continuing effort to increase the mileage of automobiles through weight reduction. Both of the aforementioned efforts must not unduly sacrifice performance or reliability. Conventional suspension systems tend to have numerous expensive heavy metal parts. It would be desirable to reduce the cost, weight and complexity of existing suspension systems.

SUMMARY OF THE INVENTION

It is therefore the primary object of the present invention to provide an improved vehicle suspension system.

Another object of the present invention is to provide a vehicle suspension system in which a primary composite element functions both as a control arm and a spring and in which one or more secondary composite elements overlap a root portion of the primary composite element to provide greater strength, a progressive spring rate, and over-load protection.

According to the illustrated embodiment of the present invention a vehicle suspension system includes a primary composite control arm element and a secondary composite control arm element. The secondary element has a length shorter than a length of the primary element. A root attachment assembly is provided for mounting an inner end of each of the primary and secondary elements to a corresponding side of a vehicle frame. The primary and secondary elements are positioned relative to each other such that the secondary element overlaps an inner portion of the primary element. An outer portion of the primary element extends beyond an outer end of the secondary element. A wheel hub assembly is mounted to the outer portion of the primary element. A shock absorber is connected to the side of the frame for damping motion of the outer end of the primary element relative to the frame. The primary and secondary composite control arm elements provide greater overall strength, a progressive spring rate, and over-load protection.

DESCRIPTION OF THE PREFERRED EMBODIMENTS

Figure 1:
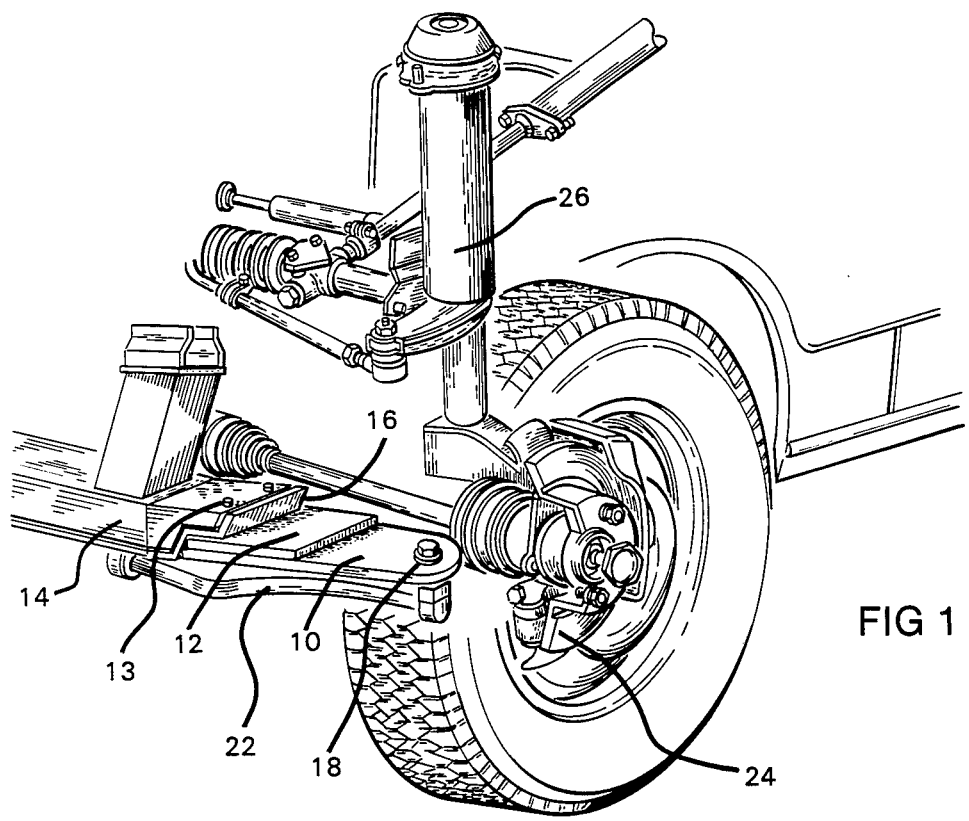
FIG. 1 is a fragmentary perspective view, with portions broken away, illustrating a first embodiment of my invention.
Figure 2:
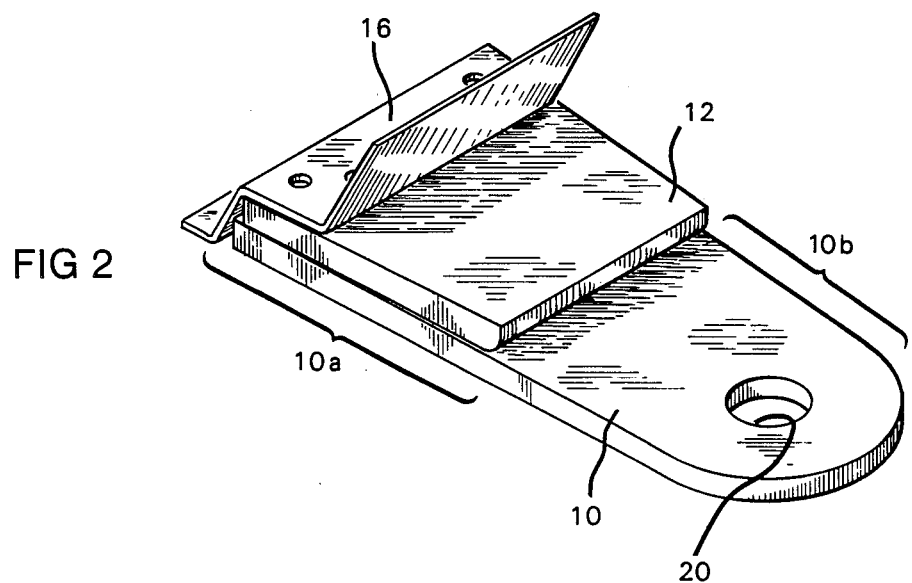
FIG. 2 is an enlarged perspective view of the combination of primary and secondary composite control arm elements of the first embodiment showing their inner ends connected to a root attachment assembly.

Referring to FIGS. 1 and 2, in a first embodiment of my invention, the inner ends of a primary control arm element 10 and a second control arm element 12, each having a uniform cross-sectional area, are rigidly connected by bolts 13 to the end of a monocouque crossbeam 14 of a vehicle frame via metal root attachment assembly 16. The cross beam 14, as illustrated, extends across the longitudinal axis of the vehicle and extends outward from the axis an equal angle, usually about 90 degrees or normal to the axis. The control arm assembly forms a cantilevered extension thereof at about the same or slightly different angle, but in any event no more than about 10 to 15 degrees from normal. The control arm elements 10 and 12 are made of a composite material such as resin-impregnated glass fibers. Various constructions for the composite elements are taught in my co-pending applications and issued patent cross-referenced above.

The secondary element 12 (FIGS. 1 and 2) has a length shorter than the primary element 10. The secondary element 12 overlaps an inner portion 10a of primary element so that an outer portion 10b of the primary element extends beyond the outer end of the secondary element 12. A bolt 18 or other attachment means extend through a hole 20 in the outer end of the primary element 10 to connect one end of a sway bar 22 and a wheel assembly 24 to the element 10. A strut or shock absorber 26 connects the wheel assembly to the vehicle frame to dampen up and down motion of the primary element 10 which functions both as a control arm and a spring.

In the first embodiment, the second composite element 12 reinforces the inner portion 10a of the primary composite element to prevent structural failure of the latter. It also makes the inner portion 10a less flexible than the outer portion 10b. Thus the secondary element 12 will serve as an overload protector in the event that the wheel is driven over a pot hole, for example. The opposing surfaces of the inner portion 10a and the element 12 are in physical contact but they are not bonded together. This allows minute longitudinal relative movements between the two elements 10 and 12 during up and down motion of the wheel assembly. The downward facing outer edge portion of the element 12 is curved to facilitate upward flexure of the outer portion 10b relative thereto. This eliminates any sharp edge of the element 12 that might otherwise cause damage to the element 10. The primary and secondary elements may have variable thicknesses along their lengths and may have a symmetric or asymmetric configuration.

Figure 3:
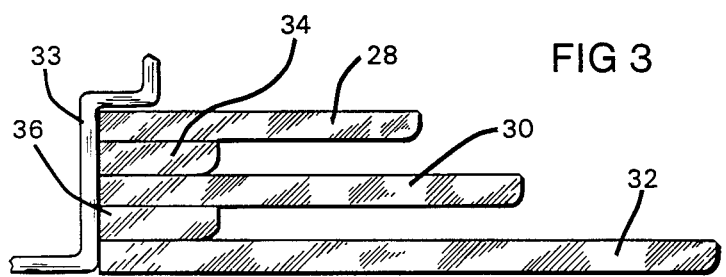
FIG. 3 is a side elevation view of a second embodiment of my invention in which three separate composite control arm elements having progressive lengths are connected to a root attachment assembly with spacer blocks therebetween.

FIG. 3 illustrates a second embodiment of my invention in which the inner ends of three composite control arm elements 28, 30 and 32 having progressive lengths are connected via root attachment assembly 33 to the car frame (not illustrated). The inner ends of the control arm elements are separated by spacer blocks 34 and 36 which may also be made of composite material, metal or other suitable material. A wheel assembly (not illustrated) is connected to the outer end of the longest control arm element 32 and a shock absorber (not illustrated) connects the wheel assembly to the vehicle frame. Under normal load conditions, the three elements 28, 30 and 32 may extend in parallel relationship to each other. In operation, the secondary control ar elements 28 and 30 are progressively engaged as more spring force is needed to resist excessive up or down movement of the wheel assembly. The outer edges of the elements 28, 30 and 32 and the blocks 34 and 36 are curved facing downwardly to facilitate relative flexing of the elements. Alternatively, the three control arm elements may extend in a non-parallel relationship in a normal load condition to vary the dynamics of the suspension system. The above described control arm assemblies may be properly called cantilever control arm assemblies. The control arm assemblies are formed by cantilever control arm elements in that they are rigidly connected at one end to a mount and extending over a space to be bridged.

Having described two embodiments of my suspension system, it will be apparent that modifications and adaptations of my invention will occur to those skilled in the art. For example, the lower end of the shock absorber could be attached directly to the outer portion of the primary control arm instead of the wheel assembly. Therefore, the protection afforded my invention should only be limited in accordance with the scope of the following claims.

I claim:

1. A control arm assembly for vehicle suspension system comprising:
    an elongate flexible composite primary control arm element having an inner end and an outer end;
    an elongate flexible composite secondary control arm element having an inner end and an outer end and a length less than that of the primary control arm element;
    means for rigidly mounting the inner end of each of the primary and secondary control arm elements to a corresponding side of a vehicle frame for extending outward along an axis transverse to a longitudinal axis of the frame for enabling controlled and guided upward and downward flexing of the control arm elements along their respective lengths;
    a wheel hub assembly mounted to the outer end of the primary control arm element; and
    shock absorber means connected between the wheel hub assemblies and the vehicle frame.

2. A vehicle suspension system according to claim 1 wherein the primary composite control arm element and the secondary composite control arm element have opposing surfaces that are in physical contact but are not bonded together.

3. A vehicle suspension system according to claim 1 wherein the inner ends of the primary composite control arm element and the secondary composite control arm element are separated by a spacer block.

4. A vehicle suspension system according to claim 1 wherein a downwardly facing outer edge portion of the outer end of the secondary composite control arm element is curved.

5. A vehicle suspension system according to claim 1 and further comprising a sway bar having one end connected to the outer portion of the primary composite control arm element.

6. A vehicle suspension system according to claim 1 and further comprising a tertiary composite control arm element having a length shorter than the length of the secondary element, the tertiary composite control arm element having an inner end connected to the side of the vehicle frame and overlapping an inner portion of the secondary composite control arm element.

7. A vehicle suspension system according to claim 6 and further comprising a first spacer block separating the inner ends of the primary and secondary composite control arm elements and a second spacer block separating the inner ends of the secondary and tertiary composite control arm elements.

8. A vehicle suspension system according to claim 7 wherein the primary, secondary and tertiary composite control arm elements extend in parallel relationship to each other.

9. A vehicle suspension system according to claim 1, wherein the primary and secondary composite control arm elements are each made of resin-impregnated glass fibers.

10. A vehicle suspension system according to claim 1 wherein the primary and secondary composite control arm elements have a uniform cross-section.

11. A cantilevered control arm assembly for a vehicle suspension system comprising:
    an elongate flexible composite primary control arm element made of resin-impregnated glass fibers and having an inner end and an outer end;
    an elongate flexible composite secondary control arm element made of resin-impregnated glass fibers and having an inner end and an outer end and a length less than that of the primary control arm element;
    means for rigidity mounting the inner end of each of the primary and secondary control arm elements to a corresponding side of a vehicle frame for extending outward along an axis transverse to and substantially normal to a longitudinal axis of the frame for defining cantilevered control arms and for enabling controlled and guided upward and downward flexing of the control arm elements along their respective lengths;
    a wheel hub assembly mounted to the outer end of the primary control arm element; and shock absorber means connected between the wheel hub assemblies and the vehicle frame.

12. A vehicle suspension system according to claim 1 wherein the primary and secondary composite control arm elements have a uniform thickness along the length thereof.

13. A vehicle suspension system according to claim 1 wherein the primary composite control arm element and the secondary composite control arm elements have opposing surfaces that are in physical contact but are not bonded together.

14. A vehicle suspension system according to claim 1 wherein the inner ends of the primary composite control arm element and the secondary composite control arm element are separated by a spacer block.

15. A vehicle suspension system according to claim 1 wherein a downwardly facing outer edge portion of the outer end of the secondary composite control arm element is curved.

16. A vehicle suspension system according to claim 1 and further comprising a sway bar having one end connected to the outer portion of the primary composite control arm element.

17. A vehicle suspension system according to claim 1 and further comprising a tertiary composite control arm element having a length shorter than the length of the secondary element, the tertiary composite control arm element having an inner end connected to the side of the vehicle frame and overlapping an inner portion of the secondary composite control arm element.

18. A vehicle suspension system according to claim 17 and further comprising a first spacer block separating the inner ends of the primary and secondary composite control arm elements and a second spacer block separating the inner ends of the secondary and tertiary composite control arm elements.

19. A vehicle suspension system according to claim 1 wherein the primary, secondary and tertiary composite control arm elements extend in parallel relationship to each other.

20. A cantilevered control arm assembly for a vehicle suspension system comprising:
  an elongate flexible composite primary control arm element made of resin-impregnated glass fibers and having an inner end and an outer end;
  an elongate flexible composite secondary control arm element made of resin-impregnated glass fibers and having an inner end and an outer end and a length less than that of the primary control arm element;
  means for rigidly mounting the inner end of each of the primary and the secondary control arm elements to a corresponding side of a vehicle frame for extending outward along an axis transverse to and substantially normal to a longitudinal axis of the frame for defining cantilevered control arms and for enabling controlled and guided upward and downward flexing of the control arm elements along their respective lengths;
  a wheel hub assembly mounted to the outer end of the primary control arm element; and
  shock absorber means connected between the wheel hub assemblies and the vehicle frame.

* * * * *

UNITED STATES PATENT AND TRADEMARK OFFICE
CERTIFICATE OF CORRECTION

PATENT NO. : 4,767,134
DATED : August 30, 1988
INVENTOR(S) : Benjamin V. Booher

It is certified that error appears in the above-identified patent and that said Letters Patent is hereby corrected as shown below:

IN THE CLAIMS

```
Claim 12, line 1, change "1" to --11--.
Claim 13, line 1, change "1" to --11--.
Claim 14, line 1, change "1" to --11--.
Claim 15, line 1, change "1" to --11--.
Claim 16, line 1, change "1" to --11--.
Claim 17, line 1, change "1" to --11--.
Claim 19, line 1, change "1" to --11--.
```

Signed and Sealed this

Thirty-first Day of January, 1989

Attest:

DONALD J. QUIGG

Attesting Officer

Commissioner of Patents and Trademarks